(12) United States Patent
Kim et al.

(10) Patent No.: US 9,753,630 B1
(45) Date of Patent: Sep. 5, 2017

(54) CARD STACK NAVIGATION

(75) Inventors: John T. Kim, La Canada, CA (US); Robert C. Borja, Jr., Daly City, CA (US); Luke L. Chastain, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 878 days.

(21) Appl. No.: 13/051,942

(22) Filed: Mar. 18, 2011

(51) Int. Cl.
*G06F 3/048* (2013.01)
*G06F 3/0485* (2013.01)
*G06F 3/0484* (2013.01)
*G06F 3/0482* (2013.01)

(52) U.S. Cl.
CPC .......... *G06F 3/0485* (2013.01); *G06F 3/0482* (2013.01); *G06F 3/04847* (2013.01)

(58) Field of Classification Search
CPC ... G06F 3/0485; G06F 3/0482; G06F 3/04847
USPC ........ 715/786, 833, 784, 783, 792, 810, 828
See application file for complete search history.

(56) References Cited

U.S. PATENT DOCUMENTS

| | | | | |
|---|---|---|---|---|
| 5,802,535 | A | * | 9/1998 | Shibuta .......................... 715/209 |
| 5,828,374 | A | * | 10/1998 | Coleman et al. .............. 715/786 |
| 5,874,958 | A | | 2/1999 | Ludolph |
| 5,910,802 | A | | 6/1999 | Shields et al. |
| 6,204,846 | B1 | * | 3/2001 | Little et al. .................... 715/784 |
| 6,614,456 | B1 | * | 9/2003 | Rzepkowski et al. ........ 715/833 |
| 7,248,269 | B2 | | 7/2007 | Card et al. |
| 7,336,279 | B1 | | 2/2008 | Takiguchi |
| 8,244,564 | B2 | | 8/2012 | Selinger et al. |
| 8,266,014 | B1 | | 9/2012 | Bhosle et al. |
| 8,666,454 | B2 | | 3/2014 | Sim et al. |
| 2002/0067380 | A1 | * | 6/2002 | Graham ........................ 345/838 |
| 2006/0004914 | A1 | | 1/2006 | Kelly et al. |
| 2007/0033220 | A1 | | 2/2007 | Drucker et al. |
| 2007/0106949 | A1 | | 5/2007 | Narita et al. |
| 2007/0276857 | A1 | | 11/2007 | Fujio et al. |
| 2008/0022229 | A1 | | 1/2008 | Bhumkar et al. |
| 2008/0201634 | A1 | | 8/2008 | Gibb et al. |
| 2010/0037183 | A1 | | 2/2010 | Miyashita et al. |
| 2010/0250336 | A1 | | 9/2010 | Selinger et al. |
| 2011/0090402 | A1 | | 4/2011 | Huntington et al. |
| 2012/0036482 | A1 | | 2/2012 | Haynes, II et al. |

(Continued)

OTHER PUBLICATIONS

Office action for U.S. Appl. No. 13/051,892, mailed on Sep. 12, 2013, Kim et al., "Fly-Out Navigation Menu", 8 pages.

(Continued)

*Primary Examiner* — Andrey Belousov
(74) *Attorney, Agent, or Firm* — Lee & Hayes, PLLC

(57) ABSTRACT

A card stack navigation interface provides an aesthetic arrangement of items that are available for selection by a user. When a user selects a stack, such as a column of items in a grid, the items in the selected column may be represented by a more complete and/or larger representation. For example, the items may be shown as images on a grid, but when selected (revealed) by the user via a column, the items in the column may include additional information such as a title, a description, a larger image, and so forth. In addition, a navigation bar may be visually associated with the grid to show a location of content of the grid with respect to all of the content, to enable a user to move to a new location in the content, or for other reasons.

23 Claims, 14 Drawing Sheets

(56) References Cited

U.S. PATENT DOCUMENTS

2012/0044163 A1    2/2012  Sim et al.
2012/0084689 A1    4/2012  Ledet et al.

OTHER PUBLICATIONS

Office Action for U.S. Appl. No. 13/051,860, mailed on Apr. 30, 2013, Kim et al., "Varying Item Density for Navigation", 16 pages.
Office action for U.S. Appl. No. 13/051,860, mailed on Nov. 28, 2012, Kim et al., "Varying Item Density for Navigation", 12 pages.
Office Action for U.S. Appl. No. 13/051,860, mailed on Mar. 26, 2014, John T. Kim, "Varying Item Density for Navigation", 16 pages.
Final Office Action for U.S. Appl. No. 13/051,892, mailed on Apr. 11, 2014, John T. Kim, "Fly-Out Navigation Menu", 10 pages.
Office action for U.S. Appl. No. 13/051,860, mailed on Aug. 28, 2014, Kim et al., "Varying Item Density for Navigation", 22 pages.
Final Office Action for U.S. Appl. No. 13/051,860, mailed on Feb. 6, 2015, John T. Kim, "Varying Item Density for Navigation", 24 pages.
Office action for U.S. Appl. No. 13/051,892, mailed on Dec. 10, 2015, Kim et al., "Fly-Out Navigation Menu", 18 pages.
Office action for U.S. Appl. No. 13/051,860, mailed on Aug. 14, 2015, Kim et al., "Varying Item Density for Navigation", 32 pages.
Office action for U.S. Appl. No. 13/051,892, mailed on Aug. 5, 2015, Kim et al., "Fly-Out Navigation Menu", 16 pages.
Office action for U.S. Appl. No. 13/051,860, Kim et al., "Varying Item Density for Navigation", mailed on Jan. 5, 2016, 34 pages.

* cited by examiner

CARD STACK NAVIGATION

BACKGROUND

Computing devices have become ubiquitous in almost every environment. Mobile telephones, laptop computers, and tablet computers are commonly used for work and pleasure and often accompany people in many daily activities. To increase portability, many devices include integrated displays that are often relatively small compared to stand-alone displays, such as computer monitors. The relatively small size of these integrated displays encourages efficient use of display space by applications run on the device to maximize access to information by a user.

In addition to efficient use of a display space, people often desire user interfaces that have an aesthetic appearance and operation. For example, people often find a collection of organized images to be more visually appealing than scattered use of text, which may require more time for a person to understand or find desired information. Some common aesthetic interfaces represent still images with animation using pan/zoom effects or varied distortion of the image to mimic three dimensional movement, and thus appeal to many people because of their unique and interesting visual display.

People typically prefer interactions with computing devices that relate to real-world interactions. For example, the widespread use of camera sensing and motion detection technology has allowed video game developers to allow people to control or interact with their gaming console through movement of their bodies or extremities. Thus, people can grab virtual objects in a similar way they would grab real objects in the real-world. People who interact with devices having relative small screens may benefit from software that allows navigation and interaction with the device that relates to interactions in the real world.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
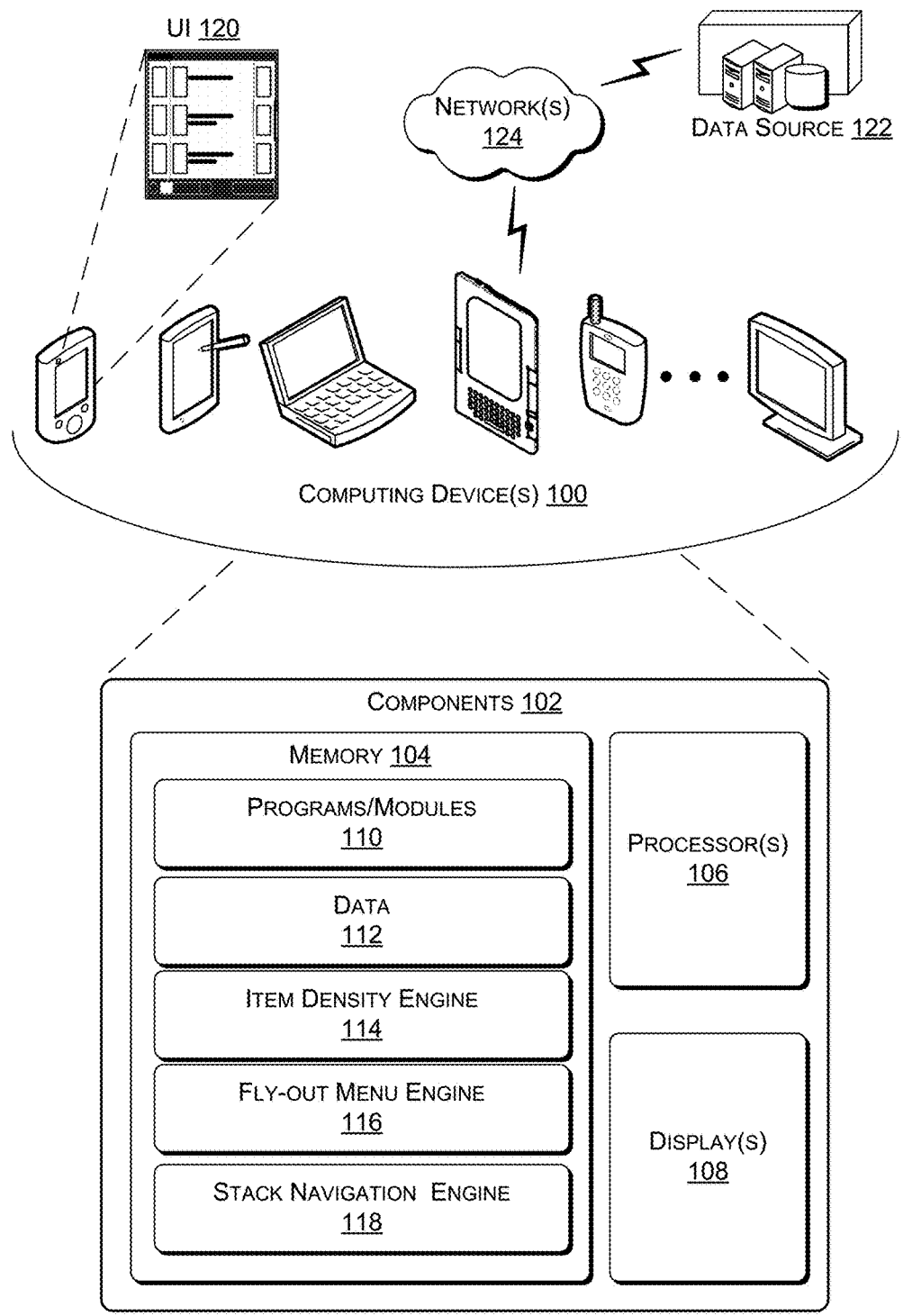
FIG. 1 is a schematic diagram of illustrative computing devices that render various user interfaces that enable users to navigate and select content.

To better accommodate users of mobile devices that include relatively small display screens, user interfaces may be implemented that enable greater access to information, increase aesthetic visualization of information, and relate interactions with a device to those performed in the real world. Described herein are at least three concepts to achieve at least these ends.

An item density navigation interface increases a density of items listed in a user interface, which may allow a user to more readily access a desired item. The interface may use a larger representation of an item that is designated as a focus item as compared to other items. The focus item may be an item last accessed by the user or have other importance. The other items may be represented in increasingly smaller representations based on their distance from the focus item, which may be minimized near the outer bounds of the interface with numbers or symbols (dots, etc.) to enable user selection. For example, the representation of the focus item may include a name and relatively short description and be represented in font size 14 point (pt), while an item adjacent to the focus item may only include a name using a font size of 12 pt and an item far from the focus item may be shown as a number having a font size of 6 pt. The focus item may change based on user interaction within the items in the interface, thus resizing representations of the items.

A fly-out navigation menu may provide an intuitive menu that allows a user to navigate within a document or collection of documents without losing a current location in the document or documents. The user may preview another location quickly using the navigation menu and then automatically return to the current (last) location without issuing further commands (e.g., no need for a "back" command). The user may also move the current location to the previewed location. The fly-out navigation menu may simulate a reader's experience when the reader holds her current page in a book with a finger and then flips forward to determine the end of a chapter or another location of the book. In such an instance the reader can quickly return to her current reading location, which is maintained by her finger (or other object).

A card stack navigation interface provides an aesthetic arrangement of items that are available for selection by a user. When a user selects a stack, such as a column of items in a grid, the items in the selected column may be represented by a more complete and/or larger representation. For example, the items may be shown as images on a grid, but when selected (revealed) by the user via a column, the items in the column may include additional information such as a title, a description, a larger image, and so forth. In addition, a navigation bar may be visually associated with the grid to show a location of content of the grid with respect to all of the content, to enable a user to move to a new location in the content, or for other reasons.

The techniques and systems described herein may be implemented in a number of ways. Example implementations are provided below with reference to the following figures.

Illustrative Computing Device

FIG. 1 shows illustrative computing devices 100 (or simply "devices") that render various user interfaces on a display that enable users to navigate and select items or locations within content. A non-exhaustive list of the devices 100 may include a notebook computer, a music player, a mobile telephone (including smartphones), a tablet computer, an electronic book (eBook) reader device, and a monitor (with or without a television tuner), and so forth. However, many other types of devices may be configured to render various user interfaces as discussed herein.

As illustrated, the devices 100 include various components 102. In some embodiments, the components 102 include memory 104 and one or more processor(s) 106. The processor(s) 106 interact with the memory 104 to execute instructions and facilitate operation of the device 100. The components 102 may also include a display 108, which may be an integrated display, or in some instances, an external display. In various embodiments, the display 108 may be a touch screen display that enables a user to interact with software through use of gestures, which may include various touch-interactions by the user with the display 108.

The memory 104, meanwhile, may include software programs or other executable modules 110 that may be executed by the processor(s) 106. Examples of such programs or modules include indexing modules for indexing data, reader programs, control modules (e.g., power management), network connection software, an operating system, sensor algorithms, and so forth. The memory 104 may also be used to store data 112, such as data files, audio and/or video media, electronic books (eBooks), or the like.

The memory 104 may include volatile memory (such as RAM), nonvolatile memory, removable memory, and/or non-removable memory, implemented in any method or technology for storage of information, such as computer-readable instructions, data structures, program modules, or other data. Also, the processor(s) 106 may include onboard memory in addition to or instead of the memory 104. Some examples of storage media that may be included in the memory 104 and/or processor(s) 106 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the devices 100. Any such computer-readable media may be part of the devices 100.

In accordance with one or more embodiments, the memory 104 may include an item density engine 114, a fly-out menu engine 116, a stack navigation engine 118, or a combination thereof. The item density engine 114 may generate and manage an interface that increases a density of items listed in the interface, which may allow a user to more readily access a desired item. The item density engine 114 may vary a size and/or amount of content associated with groups of items based at least in part on an ordering of the items relative to a focus item.

The fly-out menu engine 116 may generate and manage an interface that provides an intuitive menu that allows a user to navigate forward or backward in a document (or various documents) to preview content without losing a current location in the document(s). The fly-out menu engine 116 may generate various menus, each being associated with a respective side of the interface.

The stack navigation engine 118 may generate and manage an interface that provides an aesthetic arrangement of items that are available for selection by a user. The stack navigation engine 118 may also include a navigation bar that is associated with the grid to show a location of content of the grid with respect to all of the content and to enable a user to move to a new location in the content.

The function of the item density engine 114, the fly-out menu engine 116, and the stack navigation engine 118 are more fully described in respective sections below.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 106, as hardware, and/or as firmware. Typically, the functionality of the program modules may be combined or distributed as desired in various embodiments. An implementation of these modules and techniques may be stored on or transmitted across some form of computer-readable media.

As shown in FIG. 1, the device(s) may display a user interface (UI) 120 using the display 108. The UI 120 may be configured for user interaction using traditional input devices such as keyboards, mice, touch pads and the like; or by non-traditional input devices such as touch screens, voice commands, and motion detection that may not require dedicated controllers or buttons on the housing of the device 100.

In some embodiments, the device 100 may be in communication with a data source 122 via a network 124, such as a wired or wireless network. The data source 122 may provide information, such as a list of content, documents, images, or other data that may be processed, organized, or otherwise manipulated by the various engines described above for presentation in the UI 120. For example, the data source 122 may be an electronic marketplace that offers items and/or services for consumption by users. The various engines described above may be used to enable a user to navigate, select, access, or otherwise interact with the content from the data source 122 as well as content that is stored locally on the device as the data 112.

Illustrative Item Density Interfaces and Operation

FIGS. 2-6 show various non-limiting UIs that depict examples of varying item density across an interface to enable user navigation and selection of items. The interfaces may be arranged in any orientation (portrait or landscape), and may include any combination of text, symbols, numbers, images, or other representations to depict or represent items of content. The items of content may include any listing of items, links, documents, services, or other types of data that may be linked to additional pages of information.

Figure 2:
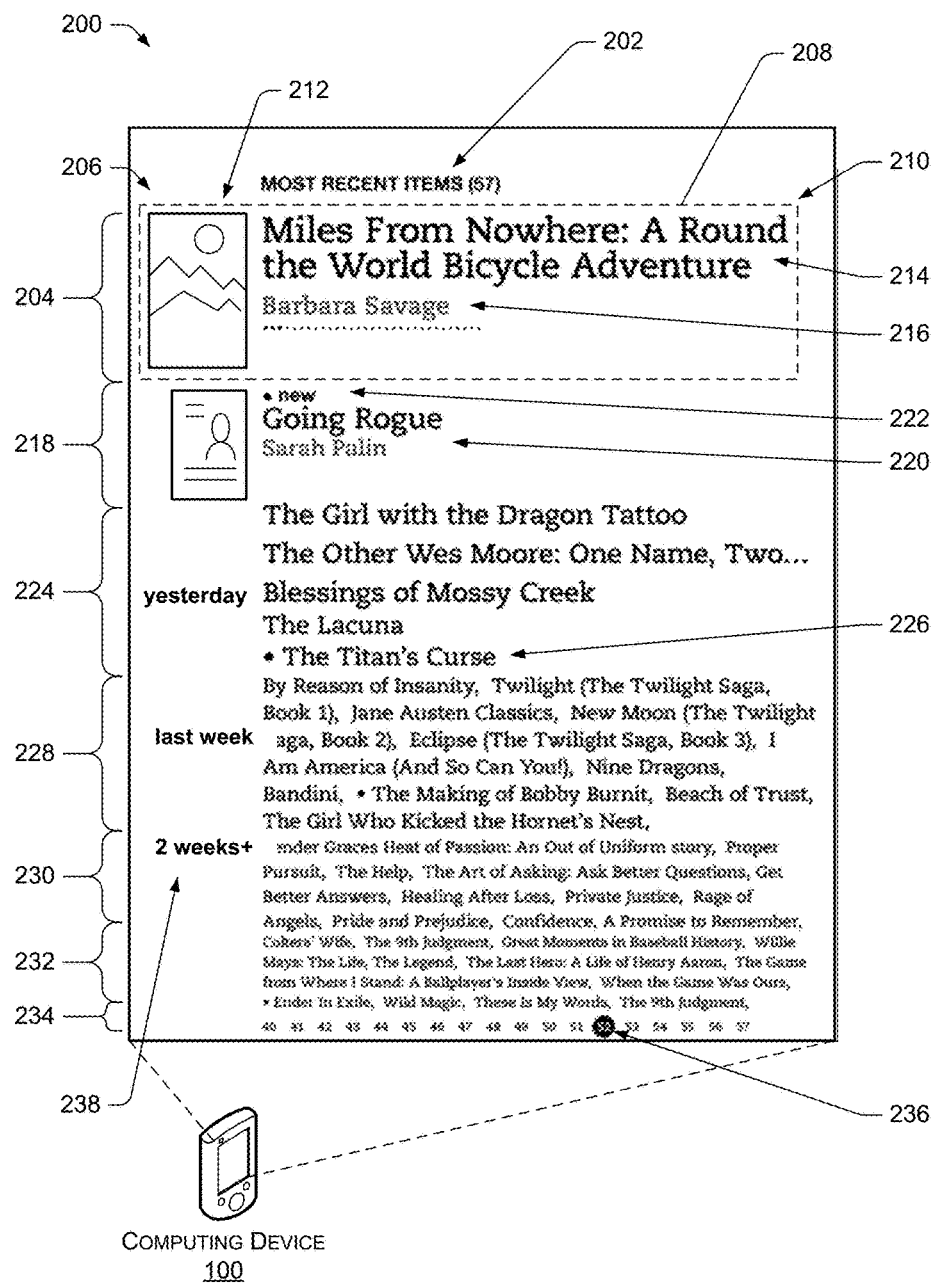
FIG. 2 is an illustrative user interface (UI) showing items having representations in various sizes and densities where the items are available for selection by a user. A focus item is shown in a lower density and thus consumes a larger respective portion of the interface as compared to other items.

FIG. 2 shows a UI 200 depicting item representations of content that decrease in size (increase in density) as the item location becomes further from a focus item (towards the bottom of the interface rendered by the device 100). An organizational cue 202 may indicate the sorting or organization of the content in the interface.

In accordance with various embodiments, items of the content may be displayed using various levels or groupings. Each level may include a listing of one or more items that are presented in various sized representations as explained below.

In a focus level 204, an item may be presented as a focus item 206. An item (or level) may be in-focus when it is a most recent selection by a user, is at the top of a list, or for other reasons. For example, when a user selects an item listed in the interface 200, the item may assume the focus-item designation. The focus item 206 may have a representation 208 that includes descriptors 210 that describe the item and possibly other information about the item. The focus item 206 may have a largest instance of the representation 208 in the interface 200 as compared to other items of the content.

As discussed above, the representation 208 may include one or more descriptor(s) 210 which may include of an image 212, a title 214, an author 216, a description, symbols, and other representations or textual information with associated sizes (e.g., font size, image size, etc.). The size of the representation is determined by the quantity and size of the descriptors. In some instances the focus layer 204 may include two or more focused items that include representations 208 of a similar or same size.

An adjacent layer 218 that is adjacent to the focus layer 204 may include one or more items, each having a representation that is slightly smaller than the representation of the focus item 206. Thus, the representation 208 of the items in the adjacent layer 218 may include fewer of the descriptors 210, descriptors of a smaller size, or a combination of both, as compared to the descriptors 210 in the representation 208 of the focus item 206. By including a smaller representation 220 in the adjacent layer 218, the adjacent layer is denser than the focus layer 204. As shown in FIG. 2, the representation of the item also includes a tag 222, which may indicate additional information about the item. The tag 222 may be represented by a symbol (e.g., a dot, star, etc), a color, a font, or by using other techniques.

Continuing down the interface 200 away from the focus layer 204 and in the order of the items, as indicated by the organizational cue 202, a next layer 224 may includes a group of items having representations that are smaller than representations of the adjacent layer 218. The representations may be smaller by again including smaller designators, fewer designators, or both. As shown in the next layer 224, illustrative representations are limited to a title of the item. Also shown in the next layer 224, an item includes another tag, which may represent the same meaning or a different meaning than the tag 222.

Continuing further down the interface 200, additional layers 228, 230 and 232 are shown as grouping of items with even smaller instances of the representation 208 in each layer. Thus, the representations in layer 230 are smaller than the representations in layer 228 but larger than the representations in layer 232. In addition, the density of the listing of items in each layer 228, 230, and 232 increases for each layer that is further from the focus layer 204. The item density is increased by presenting more unique items into a given area on the interface. For example, the listing of items in the layers 228, 230, and 232 may include multiple items per line whereas the listing of items in the layer 226 only includes one item per line. As shown in FIG. 2, the illustrative representations in the layers 228, 230, and 232 include a title of the item in decreasing font sizes per layer.

A densest layer 234 may include a smallest instance of the representation 208 as compared to the representations in the other layers that are closer to the focus layer 204. For example, the representation 208 in the densest layer 234 may include the designator 210 that is a symbol, number, letter, or other small representation, possibly as well as a smaller font size (as compared to the layer 232). As shown in the densest layer 234, an item may include yet another tag 236, which may represent the same meaning or a different meaning than the tags 222 and 226.

The interface 200 may also include headings 238 which may be based on the organizational cues 202. In some embodiments, the headings 238 may correspond to various layers. For example, a particular layer may include items that were accessed between 1 week and 2 weeks ago. The headings 238 may also be independent from the layers and yet related to the ordered items in the interface 200, thus not perfectly align with the division of items in each layer.

The number of items per layer may vary based on a layer's distance from the focus layer 204. For example, some layers may have the same number of items while other layers, particularly the denser layers, may include more items than layers closer to the focus layer.

Figure 3:
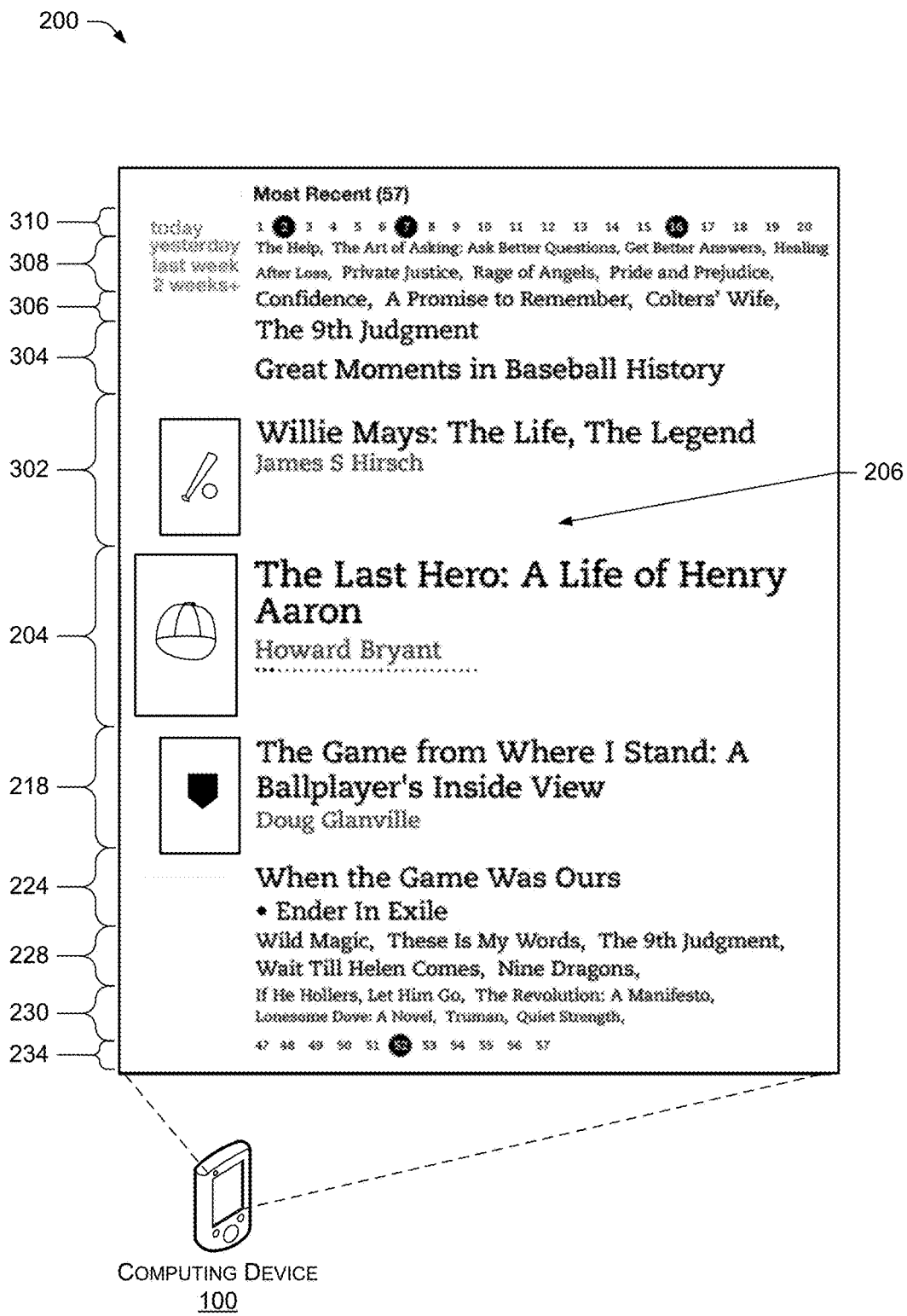
FIG. 3 is an illustrative UI showing a focus item near a midpoint of a collection of items depicted using various densities.

FIG. 3 shows the UI 200 where a focus item is located near a midpoint of a collection of items. The focus item may be relocated from the top of the interface (as shown in FIG. 2) to another location (as shown in FIG. 3) in response to receipt of user navigation (e.g., scroll down, gesture, etc.). The focus item 206 may be updated in response to a user selection, such as a user selecting a new focus item (before it was the focus item), thus causing the item to be in-focus. The user may select the new item by touching the display 108, selecting the item with a pointer, or by other selection means.

When the focus item 206 has a location that is different than at the top of the interface 200, then the interface may include two adjacent levels that are adjacent to the focus layer 204. Thus, the adjacent level 218 may be located below the focus level 204 while another adjacent level 302 may be located above the focus layer 204. In some embodiments, the other adjacent level 302 may include a same representation size (e.g., font size, image size, quantity of descriptors, etc.). However, the other adjacent level may also include a different representation size than the adjacent level 218 while remaining smaller than the representation of the focus level 204. Additional layers 304, 306, and 308, and 310 may approximately mirror the representations of the layers 224, 228, 230, and 234 as shown in FIG. 3. In various embodiments, when the focus item 206 is near the top, but not the first item listed, the number of layers below the focus layer 204 may exceed the number of layers that are above the focus layer, and vice versa.

In an example user interaction, a user may view the user interface 200 shown in FIG. 2 and then the user may select "The Last Hero." After selection of "The Last Hero" by the user, the interface 200 may be updated by the item density engine 114 to show "The Last Hero" as the focus item, and thus be presented as shown in FIG. 3.

Figure 4:
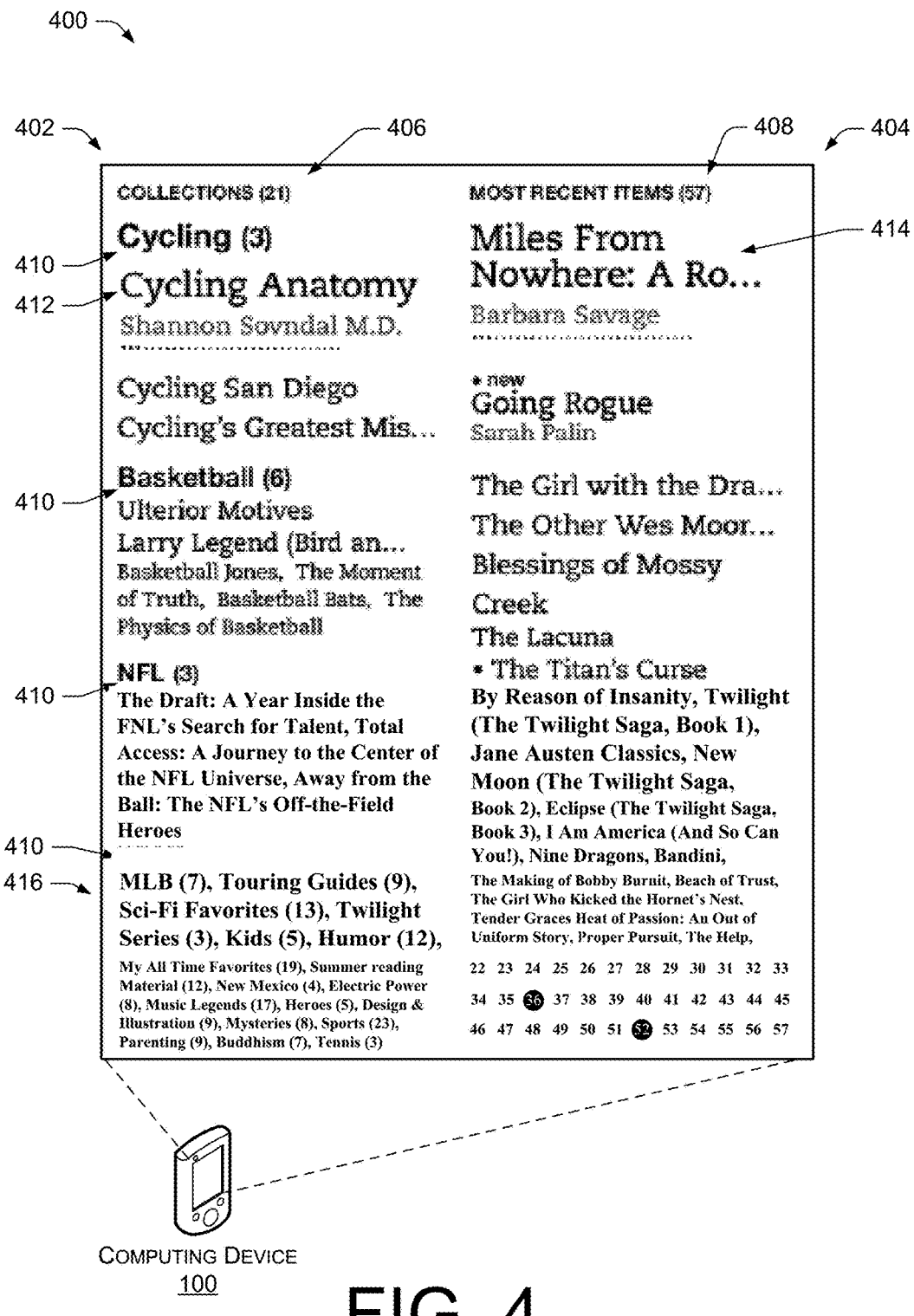
FIG. 4 is an illustrative UI showing a multi-column presentation of items depicted using various densities.

FIG. 4 shows an illustrative UI 400 that is a multi-column presentation of items depicted using various densities. As shown in FIG. 4, the UI 400 includes a collections column 402 and a most recent column 404; however, more columns may be shown on the interface. Each column 402, 404 may include an organizational cue 406, 408, respectively. For example, the organizational cue 406 may be a genre (e.g., collections, etc.), which may then include additional cues 410 within the collections column 404 that provide the list groupings of the various genres.

The columns 402, 404 in the interface 400 may each include a focus item 412, 414, respectively, which may be included in a focus layer as described above with reference to FIG. 2. Additional layers, including an adjacent layer that is adjacent to the focus layer, and other layers may be included with increasingly smaller representations.

In the collections column 402, the layers may initially include items in a collection. One or more layers near the end of the collections column may include representations that list the collections rather than individual titles within the collections as shown in the layers closer to the focus layer. Thus, the last layers 416 may include the greatest density of content. In some embodiments, one or more of the last layers 416 may include representations that are shown as numbers, symbols, or other small descriptors that represent various items or categories.

The most recent column 404 is shown in FIG. 4 using a similar layout as shown in FIG. 2. Although the most recent column 404 is shown without images, other embodiments may include images and additional descriptors as discussed above.

User interaction with the interface 400 may result in a movement of the focus item from the top to another location within a column. In some embodiments, a selection of an item (or collection, etc.) in the UI 400 may result in a conversion back to a single column format as shown in FIG. 2. In various embodiments, a selection of an item (or collection, etc.) in the UI 400 may simply move the focus item to the selected item, which may then resize other items using layers as described with reference to FIG. 3, thus layers above the focus item may include smaller representations than the representation used for the new focus item.

Figure 5:
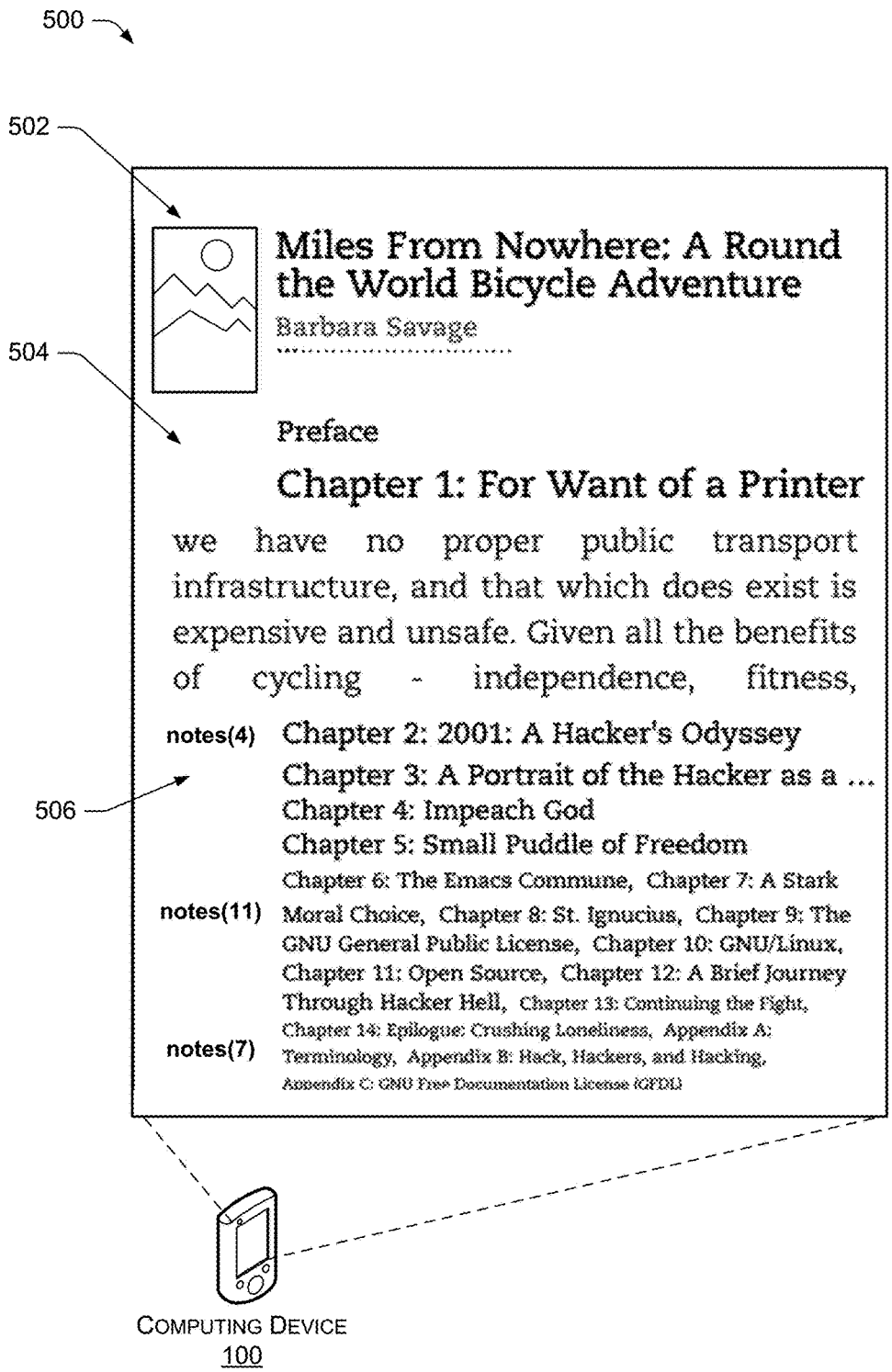
FIG. 5 is an illustrative UI showing a table of contents depicted using various densities where a current position is shown in a lower density and thus consumes a larger respective portion of the interface.

FIG. 5 shows an illustrative UI 500 depicting a table of contents depicted using various densities where a current position is shown in a lower density and thus consumes a larger respective portion of the interface. The UI 500 may include a heading 502, which may be a source of the table of contents or other information listed in the UI 500. In some embodiments, the UI 500 may also be used to present an index, a glossary, an appendix, a list of references, or other sections of a document.

The UI 500 may include a focus item 504 that is a section of the document accessible by the table of contents. For example, the representation may include a first part of a section accessible by the table of contents. Similar to the layout described in FIG. 2, the UI 500 may include layers with increasingly smaller representations based on the distance of the layers from the focus layer 504.

The UI 500 may also include access to other information, such as notes, via links 506 that are organized with respect to the various layers. For example, a layer that includes chapters 2-4 may include four notes, which are accessible via one of the links 506. The links 506 may also be used to access other relevant information depending on the content displayed in the UI 500 (e.g., index, glossary, etc.).

In various embodiments, the UI 500 may be accessible when a user selects a focus item from the UI 200 shown in FIGS. 2 and 3. For example, when the content is content available for reading using an electronic book (eBook) reading device, then a user may navigate her collection of documents using the UI 200 shown in FIGS. 2 and 3, and then open a document or eBook, which then results in a rendering of the UI 500 by the device 100.

Figure 6:
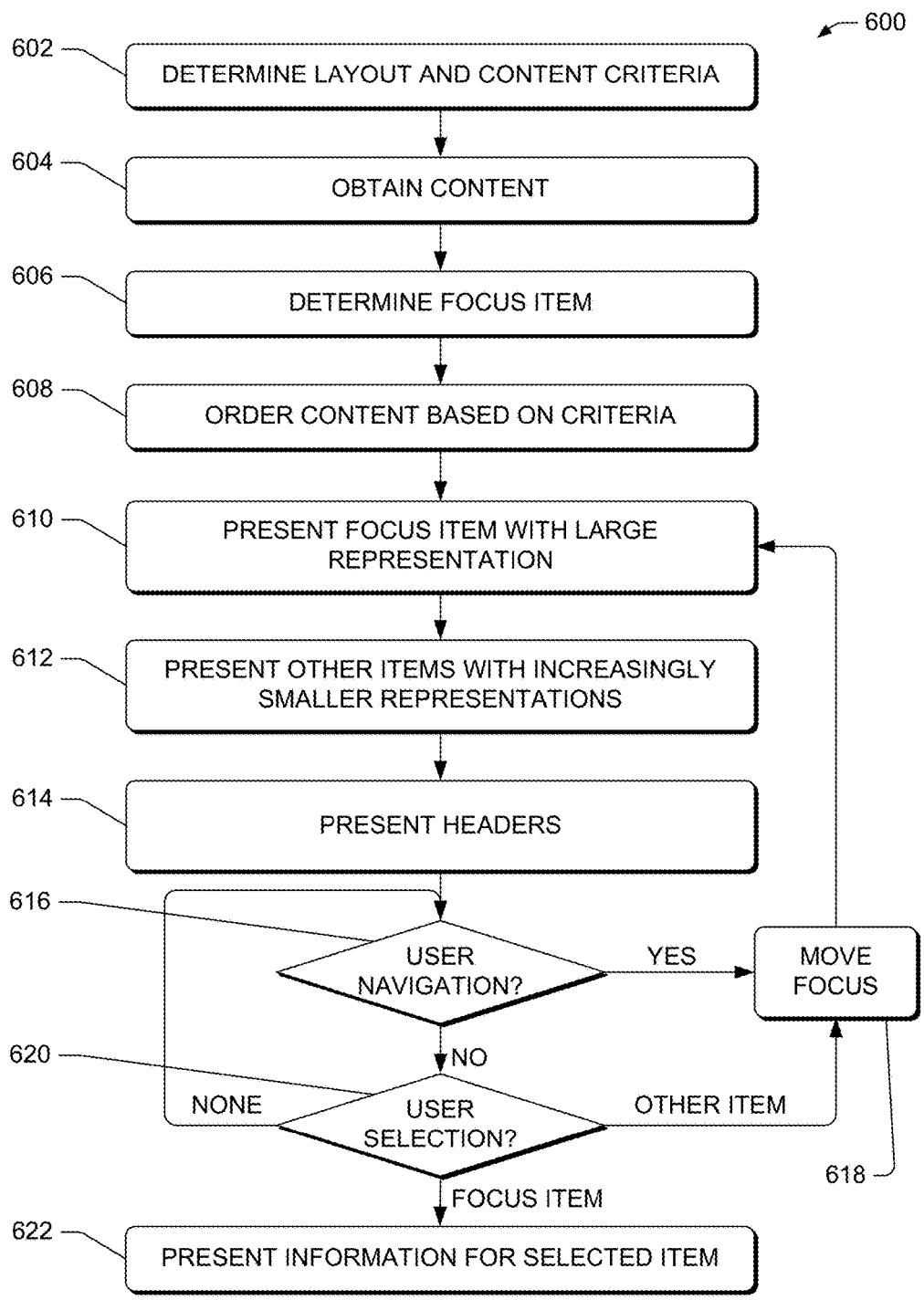
FIG. 6 is a flow diagram of an illustrative process to vary a density of items across a page relative to a focus item.

FIG. 6 is a flow diagram of an illustrative process 600 to vary a density of items across a page relative to a focus item. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 600, shall be interpreted accordingly.

The operations shown in FIG. 6 may be performed by the item density engine 114 and may result in user interfaces similar to the UI's shown in FIGS. 2-5.

At 602, the item density engine 114 may determine criteria to select content and layout the content for presentation on an interface, such as the UI 200. The criteria may include a query to select content available to the item density engine 114 (e.g., items from the data 112, items from the data source 122, etc.). The criteria may also determine the layout, such as the order of the content when presented in the UI. In some embodiments, the criteria may be provided by a user and received by the item density engine 114 at 602.

At 604, the item density engine 114 may obtain the content for use in the presentation. For example, the item density engine 114 may query the data 112 and/or the data source 122 to obtain the content using the criteria from the operation 602.

At 606, the item density engine 114 may determine an item to be in-focus (e.g., the focus item 204). In some embodiments, the focus item may be initially selected as the first item in order of the content, which may be at the top of the UI when the content is initially laid out by the item density engine 114.

At 608, the item density engine 114 may order the content based at least in part on the criteria from the operation 602. The order may be used to generate the organizational cue 202.

At 610, the item density engine 114 may present the focus item with a large representation, which is larger than representations for other items presented in the UI. The representation may include one or more designators (each having a respective size), which may be selected at 610 for presentation in the representation.

At 612, the item density engine 114 may present other items with increasingly smaller representations based on the distance from each of the other items from the focus item. For example, the other items may be grouped in layers, where each layer may include a similar sized representation that includes designators of the same type, quantity, and size.

At 614, the item density engine 114 may present headers with the content. For example, when the content is organized by the most recent items, the headers may indicate various time periods such as "today," "yesterday," "last week" and so forth.

At 616, the item density engine 114 may determine whether the device 100 has received a command from a user to navigate within the UI. For example, the user may select a down command or slide a finger down on a touch screen which, when received by the item density engine 114, (via the "yes" route) may change the focus item at 618 to another item and then continue to the operation 610. When the item density engine 114 does not receive a navigation request, then the process 600 may continue at 620 (via the "no" route).

At 620, the item density engine 114 may determine whether the device 100 has received a command from the user to select an item within the content. For example, the user may select the focus item or another item. When the user selects another item (via the "other item" route), the process 600 may change the focus item at 618 to another item and then continue to the operation 610. When the user selects the focus item, the item density engine 114 may present information from the selected item at 622. If no selection is received at 620, the process may move back (via the "none" route) to the decision operation at 616 and loop until a user input is received by the device 100 and processed by the item density engine 114. In some embodiments, the user may proceed from a selection of an item other than the focus item to the operation 622, such as in response to a different selection command (e.g., a double tap, etc.) or when the other item is within a predetermined proximity to the focus item (e.g., an adjacent item, within a threshold amount, etc.).

Illustrative Fly-Out Navigation Menu

FIGS. 7-12 show various non-limiting UIs that depict examples of fly-out navigation menus in an interface to enable user navigation and selection of items. The fly-out menu engine 116 may generate and manage operation of the fly-out navigation menus. The interfaces may be arranged in any orientation (portrait or landscape). The navigation menus may provide access to a menu, such as a table of content (as discussed below), but may also be used to access related documents, links, or other information that is related to a current document. In some embodiments, the fly-out navigation menu will shown information subsequent to (after) a current location in a document (or collection of documents) when a user activates a subsequent fly-out navigation menu and will shown information before (proceeding) the current location in the document when the user activates a preceding fly-out navigation menu. In various embodiments, the fly-out navigation menu may provide an intuitive menu that allows a user to navigate forward or backward in a document without losing a current location in the document. The user may jump to a new location quickly using the navigation menu or may preview a section and then automatically return to the current (last) location without issuing further commands, such as using a "back" command on a browser. The fly-out navigation menu may simulate a reader's experience when the reader holds her current page in a book with a finger and then flips forward to determine the end of a chapter or another location in the book.

Figure 7:
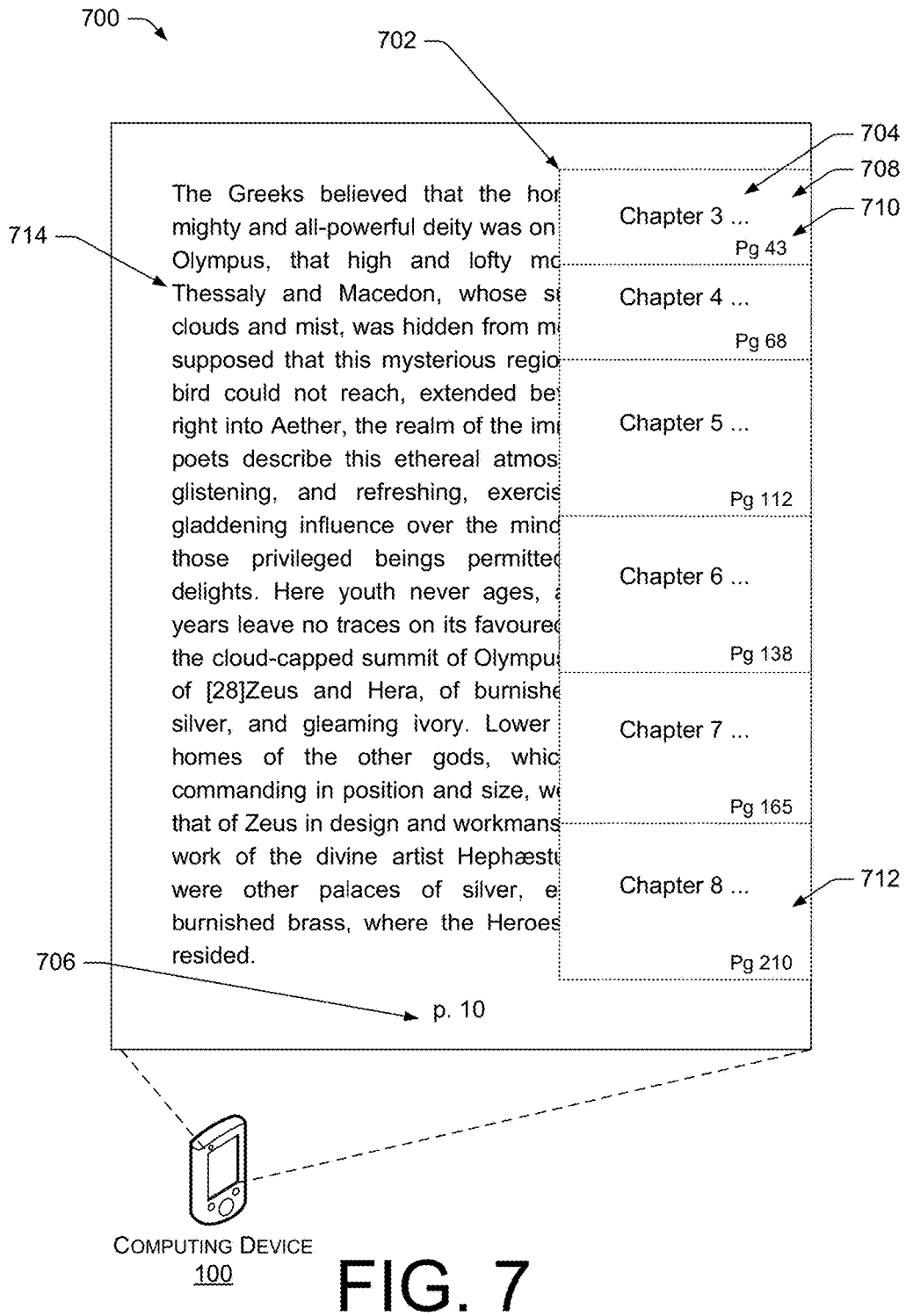
FIG. 7 is an illustrative UI showing a fly-out navigation menu.

FIG. 7 shows an illustrative UI 700 having a fly-out navigation menu 702 (the "menu"). The menu 702 may be activated by a user command associated with an edge of the interface 702. In some embodiments, the menu 702 may be associated with the right side or bottom of the interface 702 relative to a direction of text displayed in the interface. Following a user gesture associated with the respective edge, the menu 702 may "fly-out" or otherwise be revealed by the UI 700 to enable viewing and interaction by the user.

As discussed above, the menu 702 may be a menu that allows access to preceding or subsequent information in a document or collection of documents (e.g., an eBook or other electronic content with a relative order). Thus, the menu 702 may be the subsequent menu and may be activated (and then revealed) after user interaction with the right side of the interface. The menu 702 may then be revealed from the right side of the display and list selectable navigation locations 704 within the document that are subsequent to a current location 706. For example, if the current location is page 10 in chapter 2, then the subsequent menu (the menu 702) may list the navigation locations 704 starting with chapter 3 or another heading or location that is subsequent to the current location 706, such as a next heading location.

In some embodiments, the navigation locations 704 may include a descriptor 708, a location 710, and other possible information such as an image, a short description, or other relevant content. In some embodiments, a last navigation location 712 on the menu 702 may be a last location in the document or a last location on the menu 702, which may enable access to further locations using scrolling commands or in response to other user input.

In some embodiments, some of the locations shown in the menu 702 may include sub-locations, which when activated by user, may reveal the sub-locations (hierarchy, etc.). For example, when a user touches and holds a location on a touch screen that is associated with chapter 6, the menu may reveal subsections within the respective chapter.

As discussed above, the menu 702 may be used to browse information or to jump to (select) a new location in the document (or possibly another document). When browsing, the user may first reveal the menu 702 with the appropriate gesture associated with the edge of the interface 700. Next, the user may select a location using another gesture. For example, and without limitation, the user may touch and hold a location, such as chapter 5. While holding the location associated with chapter 5, a display portion 714 may be updated to show, at least temporarily, the contents of chapter 5 as a preview. When the user removes her finger from both the menu 702 and the interface 700 (or performs another simple action), the display portion 714 may automatically revert back to the current location, thus displaying the portion that was displayed prior to activation of the menu 702. However, if the user desires to jump to the new location, the user may perform another simple action, such as slide her finger to the display portion 714 and then provide a double tap (or other command) on the updated content (e.g., showing chapter 5) on the display portion, which then maintains the updated content. In this way, the user may preview other locations (e.g., browse) or jump to a new location. In another example, the user may use a first finger to engage the touch screen to "hold" the menu 702 and a second finger to scroll within a preview, thus using a chorded or combined gesture that includes multiple simultaneous selections/interactions with the touch screen to control the interface 700. The user commands used to browse and jump are examples of many possible user actions that may be interpreted by the device 100 to perform the actions (update the interface, etc.) as described herein. Thus, this disclosure is not limited to the example user interactions described herein.

In accordance with one or more embodiments, the user may also navigate within the display portion while operating in the browse mode. For example, the user may slide her finger from the menu 702 to the display portion 714 and then navigate within the display portion to scroll up or down by sliding her finger up or down in the display portion (or by using other commands). Thus, the user may then scroll through the particular location (e.g., chapter 5). Again, the user may jump to the location shown on the display portion 714 by double taping on the display portion (within a threshold amount of time, etc.) or may automatically return to a previous (current) location by removing her finger from the display portion for a predetermined amount of time, which may cause the fly-out menu engine 116 to revert back to the current location.

Figure 8:
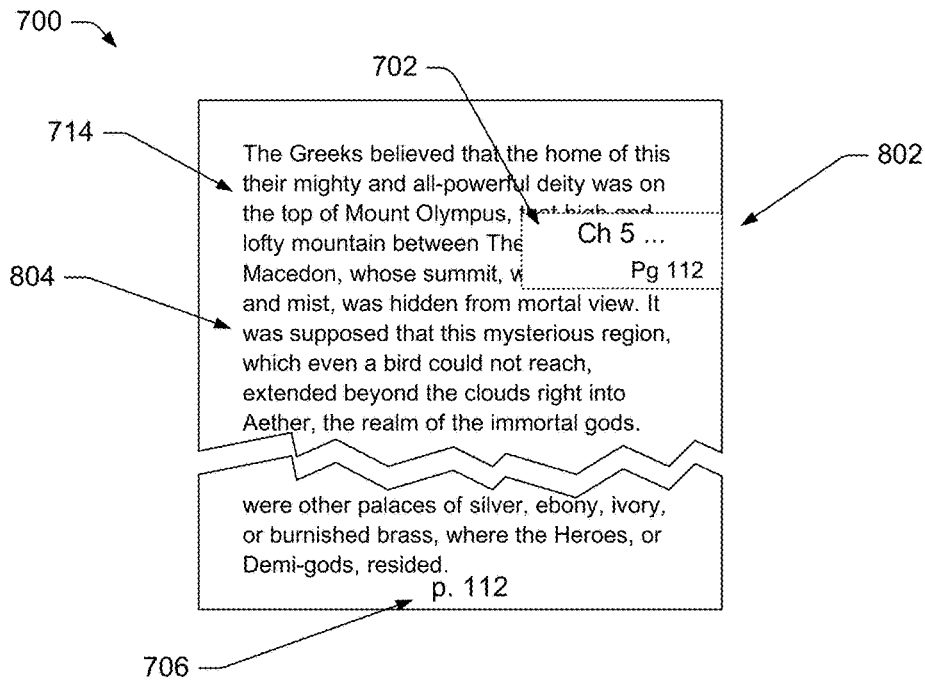
FIG. 8 is an illustrative UI showing a preview of a location selected using the fly-out navigation menu.
Figure 9:
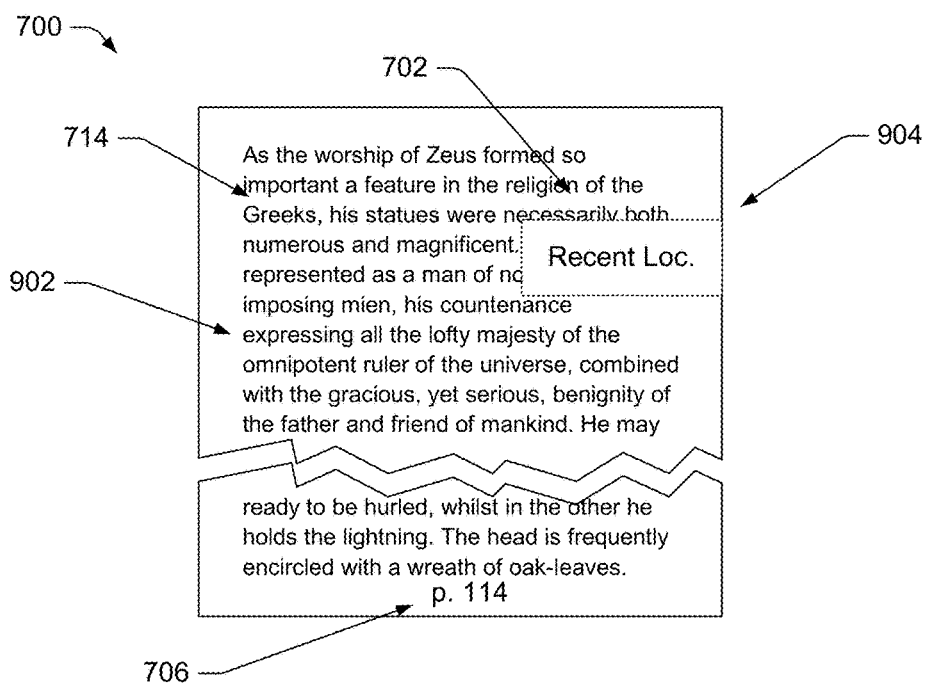
FIG. 9 is an illustrative UI showing return to a current location after viewing a preview using the fly-out navigation menu.

FIGS. 8 and 9 show example interactions with the UI 700 where a user previews (browses) a new location, jumps (moves) to the new location, and then accesses the menu to return to the recent location (previously the current location).

FIG. 8 shows the illustrative UI 700 while using the fly-out navigation menu 702. As previously discussed, when interacting with the UI 700, the user may preview (browse) a new location, such as chapter 5. During the preview, the menu 702 may be minimized to show a condensed menu 802 of a preview location 804, shown in the display portion 714. Use of the condensed menu 802, as shown in FIG. 8, may allow the user to view a larger portion of the display portion 714, and thus view more content for the selected location (e.g., chapter 5).

In FIG. 9, the UI 700 shows a new location 902, which may be accessed by the user by scrolling within the display portion 714. In some instances, the user may decide to jump to this new location, such as by double tapping on the display within a predetermined amount of time. After receiving a user gesture or command designated to perform the jump, the fly-out menu engine 116 may store the previous location (e.g., formerly the current location) as a recent location 904, which may be available, at least temporarily using the menu 702. For example, the user may access the menu 702 that may show the recent location with or without other locations.

Figure 10:
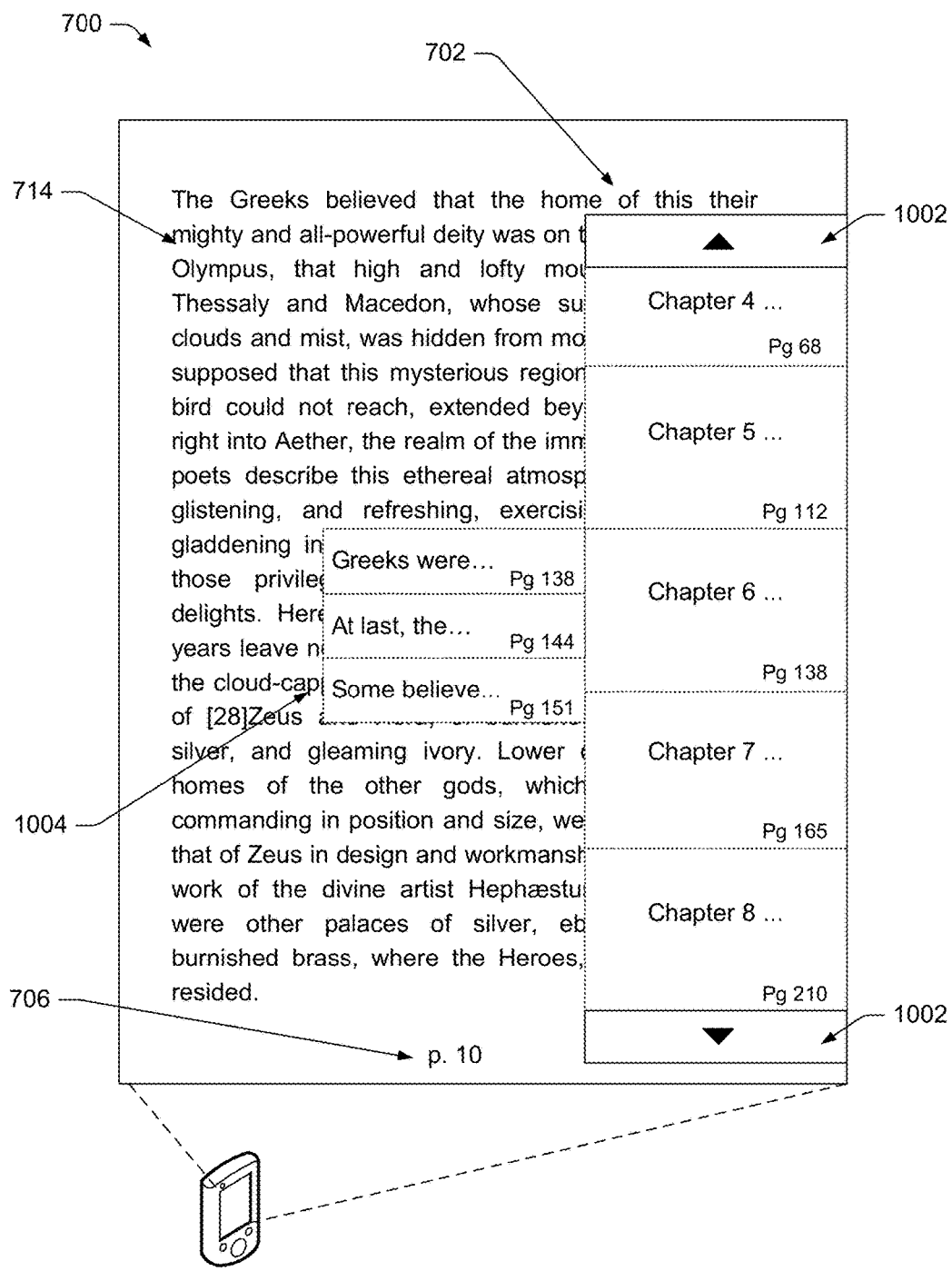
FIG. 10 is an illustrative UI showing traversal of the fly-out navigation menu.

FIG. 10 shows an illustrative UI that includes scrolling commands in the menu 702. In some embodiments, the menu 702 may include scroll commands 1002 to enable a user to move up or down within the menu. For example, when the menu 702 is used to display a relatively long table of contents that cannot easily be displayed on single menu due to screen size or font size constraints, then the fly-out menu engine 116 may include the scroll commands 1002 to allow the user to navigate within the menu 702.

In some embodiments, the menu 702 may include sub-locations 1004 that may enable the user to select a location within a location listed on a primary portion of the menu 702. Thus, the menu 702 may display a hierarchy of locations organized by various locations (chapters, sections, etc.).

Figure 11:
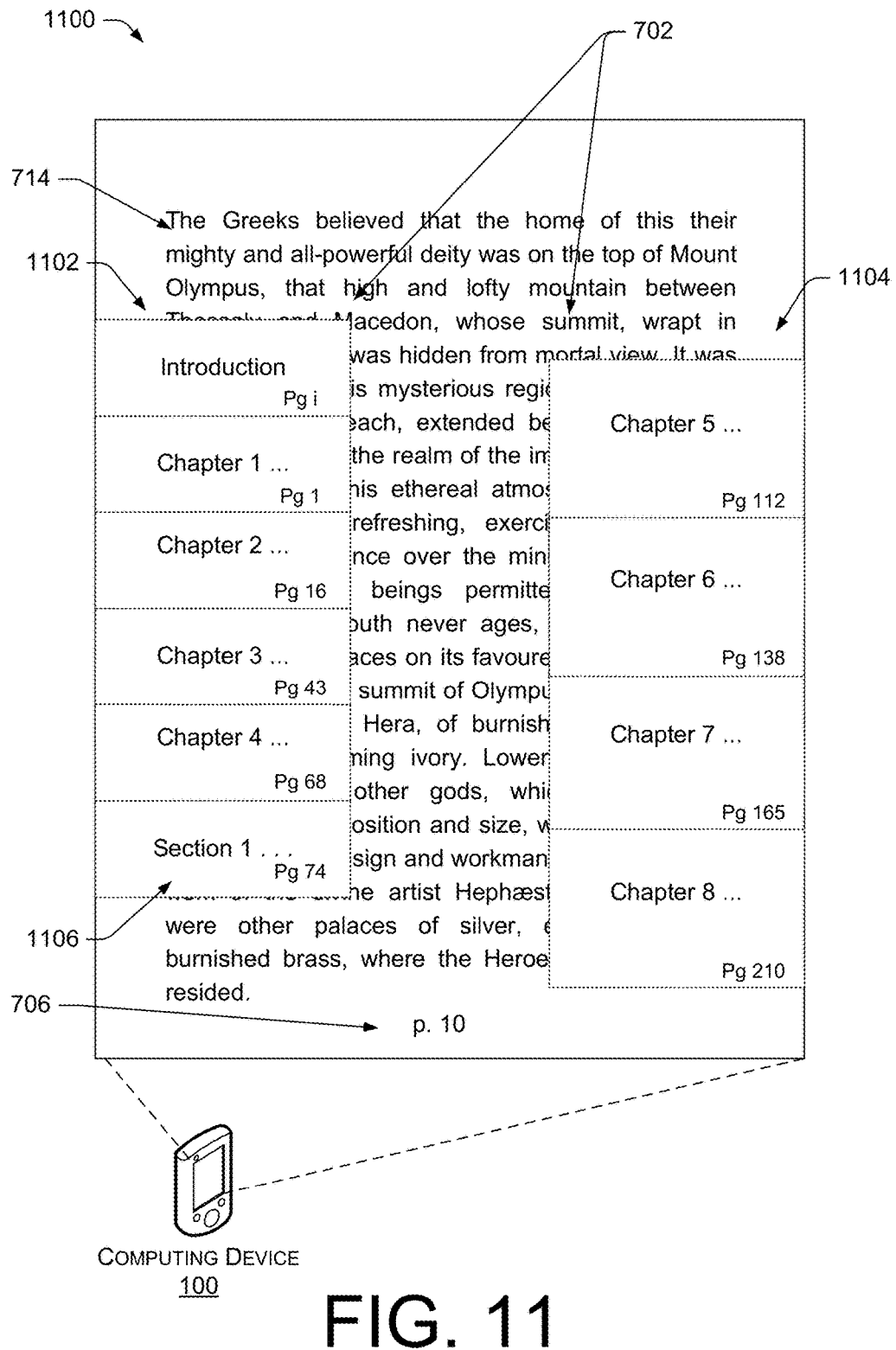
FIG. 11 is an illustrative UI showing various fly-out navigation menus.

FIG. 11 shows an illustrative UI 1100 having various fly-out navigation menus. The UI 1000 shows a previous fly-out navigation menu 1102 ("previous menu") and a subsequent fly-out navigation menu 1104 ("subsequent menu"). The previous menu 1102 may list locations that are before (precede) the current location 706 while the subsequent menu 1104 may list locations that are subsequent to (after) the current location, thus enabling intuitive selection of the menus and while reducing the amount of content displayed on the menus, which may be helpful for relatively small instances of the displays 108 on the device 100.

As previously discussed, the fly-out menu engine 116 may generate menus (e.g., the menu 702) based on a user gesture or command associated with an edge of the interface. The user may slide her finger over the display 108 from an intermediate location in the display to the left edge of the display to activate, and thus reveal, the previous menu 1102. In some embodiments, the user may perform a gesture, that when received by the fly-out menu engine 116, may result in revealing of one or more of the menus, such as both the previous menu 1102 and the subsequent menu 1104.

In some instances, location near the current location 706 may be included in the menus 702, such as a nearby location 1106 (which is shown in the previous menu 1102). The nearby location(s) 1106 may be shown in the previous menu 1102, subsequent menu 1104, or both.

Figure 12:
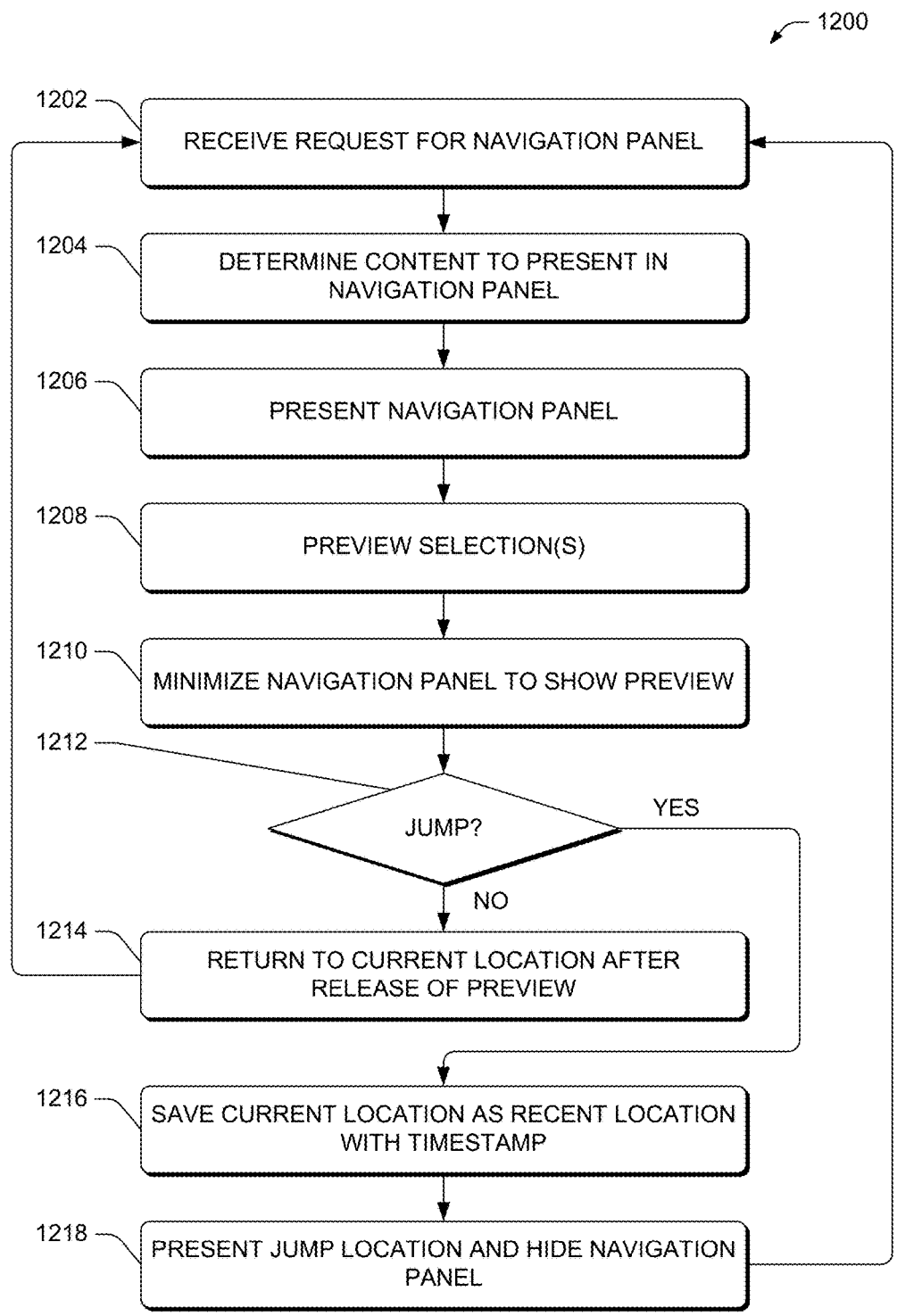
FIG. 12 is a flow diagram of an illustrative process to use the fly-out navigation menu to preview locations or select a new location.

FIG. 12 shows a flow diagram 1200 of an illustrative process to use the fly-out navigation menu to preview locations or select (jump to) a new location. As discussed above with reference to FIG. 6, the order in which the operations are described is not intended to be construed as a limitation, and any number of the described blocks can be combined in any order and/or in parallel to implement the process. The operations shown in FIG. 12 may be performed by the fly-out menu engine 116 and may result in user interfaces similar to the UI's shown in FIGS. 7-11.

At 1202, the fly-out menu engine 116 may receive a request to access the navigation menu. The request may be associated with an edge of the display 108 or interface, such as a right side, left side, top, or bottom of the interface or display.

At 1204, the fly-out menu engine 116 may determine content to present in the navigation menu. The determination may be based at least in part on the location associated with the request that is received at the operation 1202. For example, when the location is the left side (or possibly bottom) of the interface or display, then the fly-out menu engine 116 may determine the content includes the locations prior to the current location that is viewable in the interface (e.g., content of the preceding menu 1102). Similarly, when the location is the right (or possibly bottom) of the interface or display, then the fly-out menu engine 116 may determine the content includes the locations after to the current location that is viewable in the interface (e.g., content of the subsequent menu 1104).

At 1206, the fly-out menu engine 116 may present the navigation menu on a respective side of the interface or display based at least in part on the location received at the operation 1202. The navigation menu may include the content determined at the operation 1204.

At 1208, the fly-out menu engine 116 may generate a preview of a selection (location) in response to a user command (e.g., gesture on a touch screen, keyboard selection, track pad gesture, etc.) within the navigation menu, or possibly within a preview (scroll within previewed location). The preview may replace text, imagery, or other content that is in a display portion of the interface and relates to the current location. Thus, the user may preview another portion of the document or possibly other documents while retaining the current location for an automatic reversion upon a termination of the previewing.

At 1210, the fly-out menu engine 116 may minimize at least a portion of the navigation menu to show the preview. For example, when the user gestures in the display portion and off of the navigation menu, then the navigation menu may be minimized as shown in the condensed menu 802 in FIG. 8.

At 1212, the fly-out menu engine 116 may determine whether a jump (or selection) command has been received from the user. The jump command may be a gesture that, when received, may change the previewed location in the display portion to be the current location, thus moving to this location from the recent location (previously the current location). In contrast, when the user is previewing, the user may automatically return to the current location when the user is done previewing.

When the fly-out menu engine 116 does not receive the jump command, at 1214, the fly-out menu engine may return to the current location after a termination of the preview. For example, the user may release her finger from the interface or provide another type of input (or lack thereof), which may trigger the fly-out menu engine 116 to return to the current page without further action by the user, thus mimicking a user returning to a current location in a physical book that is held with her finger while she is browsing in a different section in the book.

When the fly-out menu engine 116 does receive the jump command, at 1214, the fly-out menu engine may save the current location as a recent location. In some embodiments, the current location may be saved with a time stamp.

At 1218, the fly-out menu engine 116 may present the jump location as the current location in the display portion, thus actually moving to the previewed location rather than just showing the previewed location momentarily during browsing. The fly-out menu engine 116 may also hide the navigation menu at 1218. The navigation menu, if accessed within a predetermined amount of time, may display the recent location (possibly based on the timestamp).

The process 1200 may continue from the operations 1218 or 1214 back to the operation 1202 during interaction with the fly-out menu engine 116.

Illustrative Card Stack Interface

FIGS. 13-16 show various non-limiting UIs that depict examples of a card stack to enable user navigation and selection of items. The interfaces may be arranged in any orientation (portrait or landscape), and may include any combination of text, symbols, numbers, images, or other representations to depict or represent items of content. The items of content may include any listing of items, links, documents, services, or other types of data that may be linked to additional sources or pages of information.

A card stack navigation interface provides an aesthetic arrangement of items that are available for selection by a user. When the user selects a stack, such as a column of items in a grid, the items in the selected column may be represented by a more complete and/or larger representation. For example, the items may be shown as images on a grid, but when selected (revealed) by the user via a column, the items in the column may include additional information (descriptors) such as a title, a description, a larger image, and so forth. In addition, a navigation bar may be visually associated with the grid to show a location of content of the grid with respect to all of the content, to enable a user to jump to a new location in the content, or for other reasons.

Figure 13:
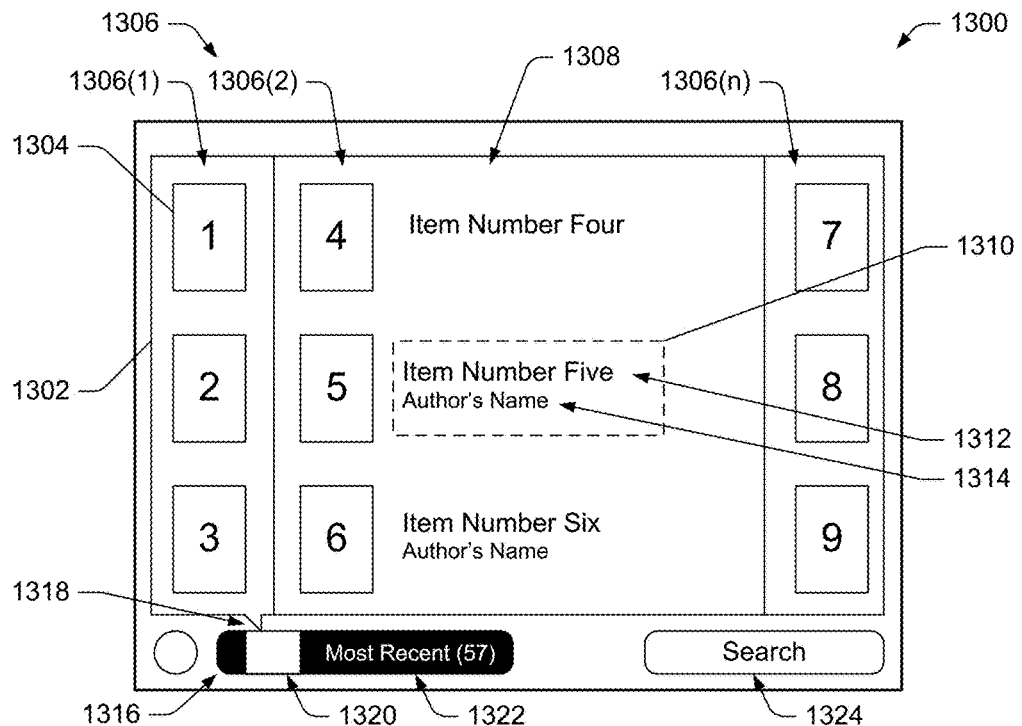
FIG. 13 is an illustrative UI showing a card stack representation of items that are selectable by a user and also showing a navigation bar.

FIG. 13 shows an illustrative UI 1300 having a card stack representation of items. The UI 1300 includes an item section 1302 that shows at least a portion of items 1304 of content the meet predetermined selection criteria, such as a type of document, etc. The items may be arranged in any number of stacks (or columns) 1306, such a stacks 1306(1), 1306(2), . . . , 1306(n). In some embodiments, the item section 1302 may be arranged as a grid of items where the columns in the grid are stacks. Thus, the item section 1302 may also be referred to as a grid section. For example, the items 1304 may be listed alphabetically across the stacks. Each stack may include a number of the items 1304. At least one stack may be revealed (i.e., revealed stack 1308), which is shown as stack 1306(2) in FIG. 13. The revealed stack may include items with a larger instance of a representation 1310, and thus include more descriptors and/or descriptors of a greater size (font size, image size, etc.) for items in the revealed stack than the items in the other stacks. The descriptors may include a title 1312, an author 1314, a short description, a price, or other relevant data for the items.

The stack navigation engine 118 may generate and manage the card stack representations, such as by selecting the items 1304 of content to be presented in the item section 1302, allowing the user to navigate within the item section to show other items, and/or to reveal representations of a stack as the revealed stack 1308. For example, as shown in FIG. 13, items 1-9 are shown in three stacks. The middle stack is the revealed stack 1308 and contains items 4, 5, and 6 that include larger representations than items 1-3 and items 7-9, which may only show an image, a small amount of text (e.g., a title, etc.) and so forth. The stack navigation engine 118 may enable a user to view additional items, such as items 10-12 by traversing to the right (e.g., in response to a user swipe from left to right across a touch-enabled display, etc.). The stack navigation engine 118 may toggle between revealing and collapsing (un-revealing) a stack when the stack is selected by a user.

In various embodiments, the stack navigation engine 118 may generate and manage a navigation bar 1316. The navigation bar 1316 may enable the user to move to another portion of the items and thus update the item section 1302. The navigation bar 1316 may also show a relative position of the portion of items in the item section 1302. The navigation bar 1316 may include a visual connector 1318 that links a representative bar 1320 to the item section 1302. The representative bar 1320 may represent an amount of items in the item section as compared to all the items of content that meet the criteria for item selection. The visual connector 1318 may create an intuitive link between the items in the item section 1302 and the representative bar 1320. The navigation bar 1316 may also include item information 1322 about the criteria or ordering of the items in the item section 1302, such as "most recent items," etc. The item information 1322 may also include a total count of the items of content that meet the criteria. In some embodiments, the UI 1300 may also include a search field to enable the user to search for items in the content.

Figure 14:
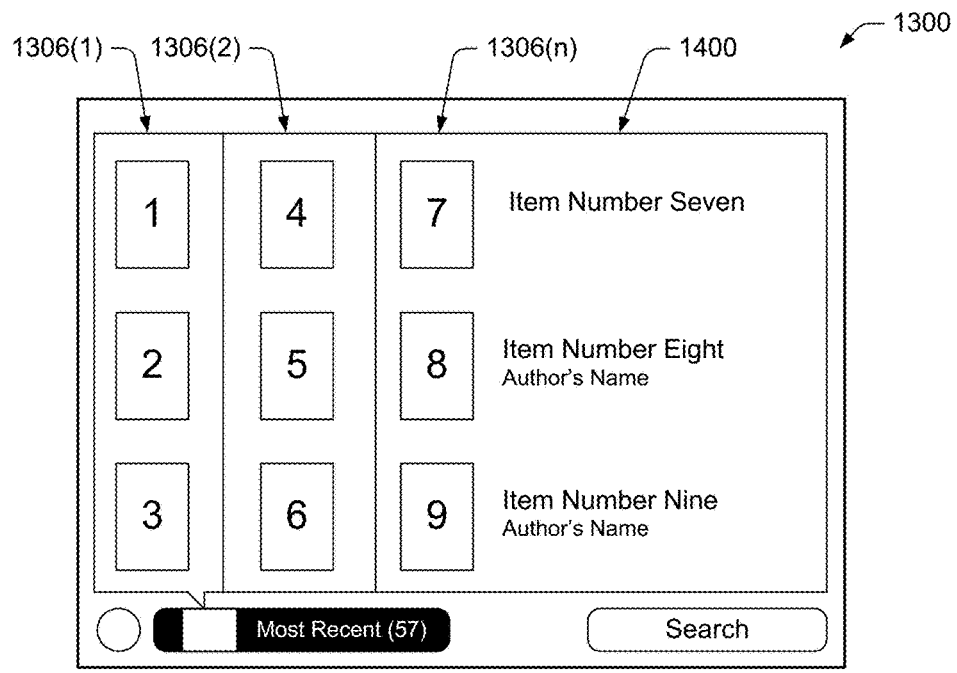
FIG. 14 is another illustrative UI showing the card stack representation of items after manipulation by a user.

FIG. 14 shows the illustrative UI 1300 having the card stack representation of items after manipulation by a user. For example, the UI 1300 as depicted in FIG. 14 may result from a user command such as when the user touches the stack 1306(n) and drags to the left of the UI 1300. This user action may prompt the stack navigation engine 118 to "close" or reduce the revealed stack 1308 that includes items 4, 5, and 6, and then reveal another stack, such as a revealed stack 1400 that includes items 7, 8, and 9. In some embodiments, the revealing and collapsing of columns may be shown using animation.

Figure 15:
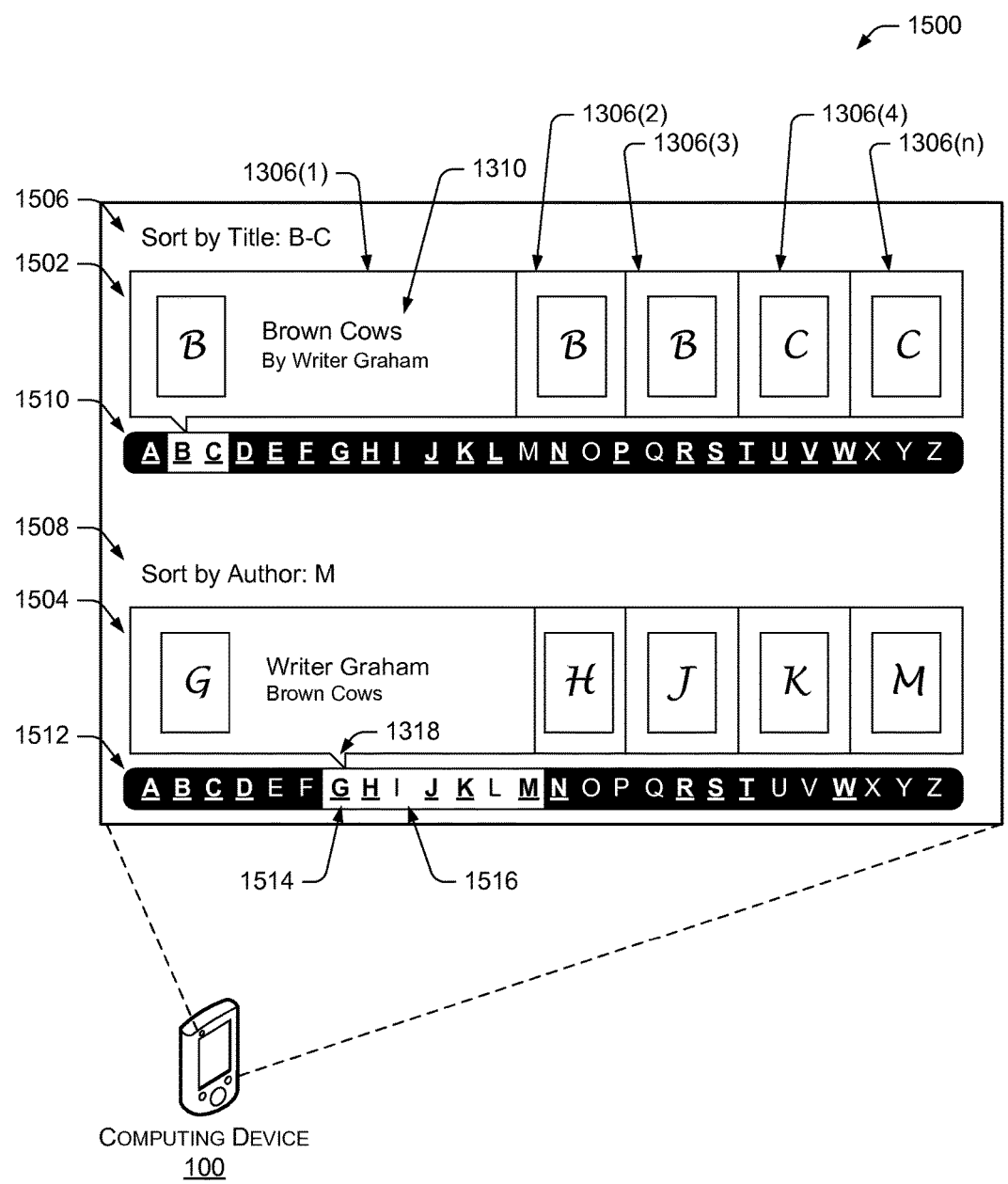
FIG. 15 is an illustrative UI showing various card stack representations of items with respective navigation bars.

FIG. 15 shows an illustrative UI 1500 having various card stack representations of items with respective navigation bars. A title section 1502 may include items sorted by title while an author section 1504 may include items sorted by the author. Each section may include respective headers 1506, 1508 that indicate a sorting and/or criteria of the content or portion of the content shown in the sections. As shown in the title section 1502, a revealed stack 1306(1) may include a larger instance of the representation 1310 than the other stacks 1306(2)-1306(n). The stacks that are shown in the interface 1500 may include one or more items, which may be aligned in a vertical column, as shown in FIG. 13, when more than one item is included in a stack.

A title navigation bar 1510 and an author navigation bar 1512 may be used to show a relative position of the items in the respective sections and also enable a user to navigate within the content by changing the items shown in the respective sections. As shown in FIG. 15, the navigation bars are represent an alphabet and shows items listed based on representative letters of the alphabet. For example, the author navigation bar 1512 shows items with author names between "G" and "M". Present letters 1514 may include special identification when an author of that letter (or symbol, character, etc.) is present while absent letters 1516 may include another type of identification, such as absence of an item beginning with that letter. In some embodiments, only the present letters 1512 (or other indicators) may be shown in the navigation bar 1510. The visual connector 1318 may connect the revealed stack to the appropriate letter of the alphabet in the navigation bar. For example, when visual connector 1318 may connect to the letter "B" for the title "Brown Cows" in the title section 1502. In some embodiments, the visual connector 1318 may just create a visual link to the portion of the navigation bar 1510 that represents items shown in the grid.

The stack navigation engine 118 may enable a user to navigate to an item using any of the sections shown in FIG. 15. In some embodiments, the stack navigation engine 118 may update all sections when a user navigates to a new item with a particular section. For example, when a user selects a document called "Brown Cows" by "Writer Graham," then the author section 1504 may reveal the same item and show other items in the sorting used by the author section. In various embodiments, each section may operate independently allowing a user to explore content in various different ways using various different organizations and criteria.

Figure 16:
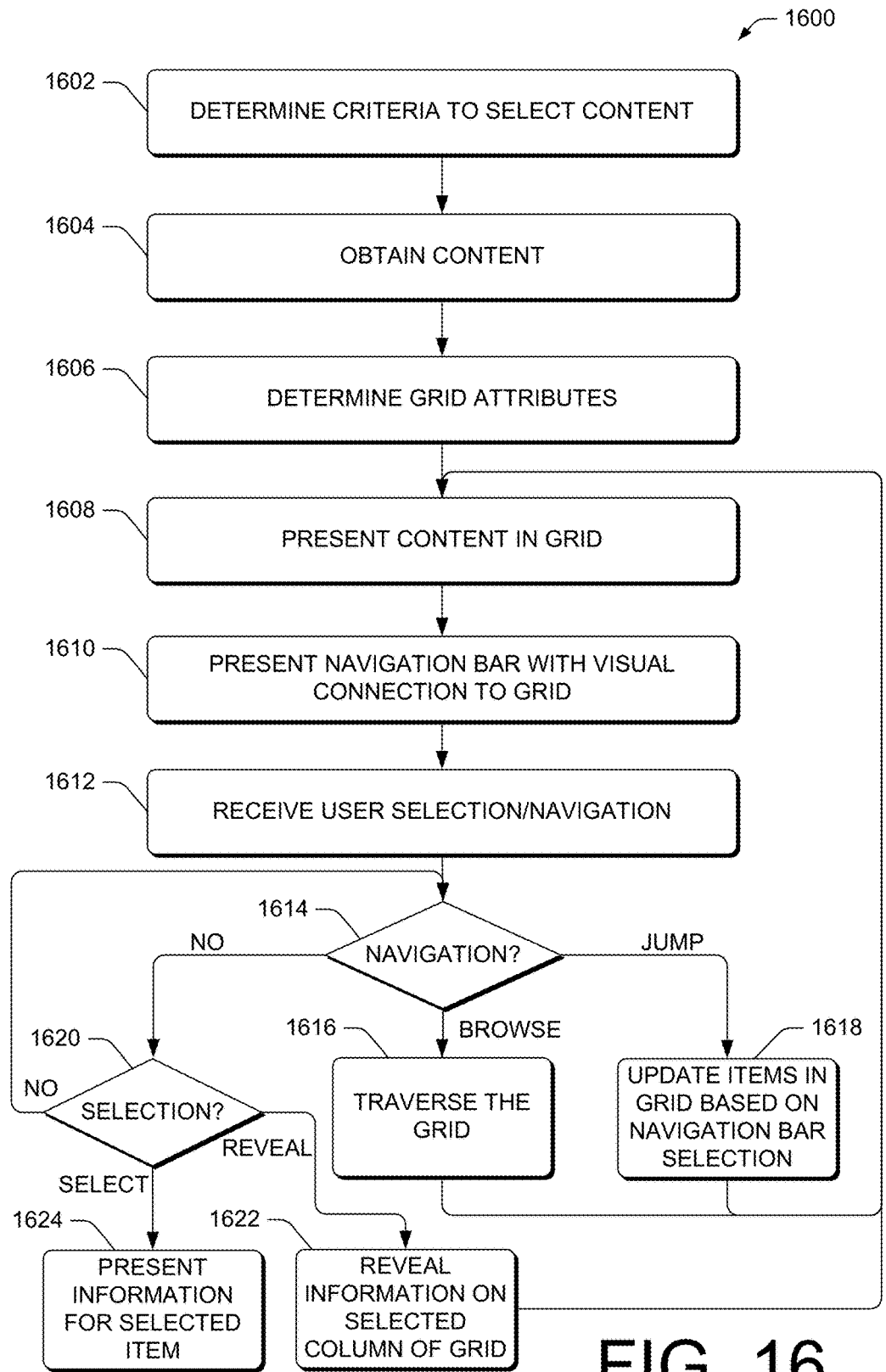
FIG. 16 is a flow diagram of an illustrative process to use the card stack to navigate through a grid of items.

FIG. 16 shows a flow diagram of an illustrative process 1600 to use the card stack to navigate through a grid of items. As discussed above with reference to FIGS. 6 and 12, the order in which the operations are described is not intended to be construed as a limitation, and any number of the described blocks can be combined in any order and/or in parallel to implement the process. The operations shown in FIG. 12 may be performed by the card stack engine 118 and may result in user interfaces similar to the UI's shown in FIGS. 13-15.

At 1602, the card stack engine 118 may determine criteria to select content for a section of items in the card stack.

At 1604, the card stack engine 118 may obtain the content, such as by querying content based on the criteria.

At 1606, the card stack engine 118 may determine grid attributes to layout the items of the content. The grid attributes may include a number of items per stack, a number of stacks in the interface, whether a stack is revealed, and representations for the images in the revealed stack and the other stacks, and any other attributes of the items or representations thereof.

At 1608, the card stack engine 118 may present the items in the grid. In some instances, no stacks are revealed in the initial presentation of the stacks while in some instances, one of the stacks is revealed by default in the initial presentation of the stacks.

At 1610, the card stack engine 118 may present the navigation bar with a visual connection to the items in the grid. The navigation bar may include a relative amount of area of a first type that represents the amount of the items shown in the item section as compared to all of the items in the content.

At 1612, the card stack engine 118 may receive a command (input, gesture, etc.) from a user to navigate within the card stack and/or select an item from the card stack.

At a decision operation 1614, the card stack engine 118 may determine whether the command from the operation 1614 is a navigation command. When the command is a navigation command, the card stack engine 118 may move (browse) within the item section or jump to a new location (show new items in the grid portion) using the navigation bar. Each action is described in turn.

At 1616 (via the "browse" route), when the card stack engine 118 receives a command to move (browse) the section of items (i.e., access items outside of view of the grid), the section of items is updated in response to the command. For example, the card stack engine 118 may receive a command to move to the right via a user's finger movement across a touch screen from right to left, a right control button, or another command to move or cycle items into and out of the item section 1302.

At 1618 (via the "jump" route), when the card stack engine 118 receives a command to jump to a new location using the navigation bar 1316, the items section 1302 may be updated based on the portion of the navigation bar that was selected by the user. For example, when a user touches the far right side of the navigation bar 1316, then the card stack engine 118 may provide an animated movement (like a slot machine) to traverse through the items to ultimately show the items represented by the portion of the navigation bar that was touched by the user.

After either of the operations 1616 or 1618, the card stack engine 118 may continue processing at the operation 1608 and present the content in the grid (item section).

When the card stack engine 118 does not receive a navigation command (via "no" route from the decision operation 1614), then the card stack engine may determine at 1620 whether a selection has been received at the operation 1612.

At 1622 (via the "reveal" route), when the card stack engine 118 receives a command to reveal a new card stack, the currently revealed card stack (if any) is closed while the new stack selected via the command is converted to the revealed stack by enlarging the representation for the selected stack. In some embodiments, the command may be a gesture recognized by a touch screen. The gesture may simulate closing the revealed stack, such as a pinch movement, slide across revealed stack, etc. A second gesture may simulate opening another stack to reveal that stack, such as by a reverse pinch movement, a slide across the stack, etc. Processing may continue from the operation 1622 to the operation 1608.

At 1624 (via the "select" route), the card stack engine 118 may present information associated with the selected item, open the item, purchase the item, or otherwise enable the user to interact with the item. The selection command may be distinguishable from the reveal command at the operation 1612 by use of different selectors, gestures, context of the selected item, and so forth.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method of providing an interface enabling user navigation and selection of items, the method comprising:

under control of a computing device configured with executable instructions, determining one or more criteria for use in selecting the items;
obtaining the items based at least in part on the one or more criteria;
presenting a first plurality of the items in a first stack of a grid used to present the items, the grid including a plurality of stacks that includes the first stack and a second stack, wherein a first item of the first plurality of the items includes a first collapsed descriptor that comprises an image or a symbol describing the first item;
replacing the first collapsed descriptor of the first item in the first stack with a first revealed descriptor, the first revealed descriptor comprising textual information describing the first item and, in comparison with the first collapsed descriptor, at least one of a different image, a different title, a different author, or a different symbol describing the first item;
presenting the first item in the first stack with the first revealed descriptor, the first revealed descriptor presented in the grid within the first stack and having at least one of a greater font size or a greater image size than the first collapsed descriptor;
presenting a second item of the items in the second stack with a second collapsed descriptor, the second stack being a collapsed stack and the second collapsed descriptor being presented in the grid within the second stack;
presenting a second plurality of the items in the first stack, wherein a third item of the second plurality of the items includes a third collapsed descriptor;
replacing the third collapsed descriptor of the third item of the second plurality of the items with a third revealed descriptor; and
presenting the items of the second plurality in the first stack with the third revealed descriptor, wherein the third revealed descriptor comprises second textual information describing the second plurality of items and, in comparison with the third collapsed descriptor, at least one of a second different image, a second different title, a second different author, or a second different symbol.

2. The method as recited in claim 1, further comprising presenting a navigation bar in the interface with a visual connector that links the navigation bar to the grid, wherein the visual connector shows a location of the first item with respect to the items.

3. The method as recited in claim 1, further comprising collapsing the first stack after receipt of a user selection of the second stack or the second item.

4. The method as recited in claim 3, further comprising revealing the second stack to reveal a second revealed descriptor of the second item in the second stack, the second revealed descriptor being presented within the second stack.

5. A computer-implemented method comprising:

under control of a computing device configured with executable instructions,
presenting, based at least in part upon selection criteria, a grid including a plurality of columns, wherein a first column of the plurality of columns has a plurality of items that satisfy the selection criteria, a first item of the plurality of items having a first collapsed descriptor presented in the grid within a first column of the plurality of columns;
revealing the first column in the grid to reveal the first item, the first item having a first revealed descriptor that has at least one of a greater font size or a greater image size as compared to the first collapsed descriptor;
displaying the first item in the first column with the first revealed descriptor, the first revealed descriptor displayed in the grid within the first column, the first revealed descriptor including first textual information describing the first item and at least one of an image, a title, an author, or a symbol describing the first item;
displaying a second item in the first column with a second revealed descriptor, the second revealed descriptor displayed in the grid within the first column, the second revealed descriptor including second textual information describing the second item and at least one of a second image, a second title, a second author, or a second symbol describing the second item;
displaying a third item of the plurality of items in a collapsed second column of the plurality of columns, the third item having a third collapsed descriptor presented in the grid within the second column, the third collapsed descriptor including at least one of a third image, a third title, a third author or a third symbol describing the third item;
presenting a navigation bar with a visual connector that links the navigation bar to the grid, the visual connector showing a location of the first item in the first column with respect to the plurality of items;
receiving an input associated with moving the visual connector within the navigation bar from the first column to the second column;
displaying, based at least in part upon the input, the third item of the plurality of items and a third revealed descriptor; and
concealing, based at least in part upon the input, the first item in the first column and the first descriptor.

6. The method as recited in claim 5, wherein the navigation bar further includes a description of one or more criteria corresponding to the plurality of items, and includes a quantity of the plurality of items.

7. The method as recited in claim 5, further comprising collapsing the first column after receipt of a user selection of the collapsed second column or of an item in the second column.

8. The method as recited in claim 7, further comprising revealing the user-selected collapsed second column to provide a revealed second column and to reveal a third revealed descriptor of the third item, the third revealed descriptor being presented in the grid within the revealed second column.

9. The method as recited in claim 5, further comprising:
updating the plurality of items presented in the grid after receipt of a user command to traverse the grid based at least in part on user interaction with the navigation bar; and
collapsing the first column after the user interaction with the navigation bar.

10. The method as recited in claim 5, wherein the visual connector includes lines that link bounds of the grid to respective portions of the navigation bar to show a relative location of the first item in the first column with respect to the plurality of items available for view in the grid.

11. The method as recited in claim 5, wherein the navigation bar includes an alphabetical listing that represents the plurality of items available for view in the grid.

12. The method as recited in claim 11, wherein the alphabetical listing includes letters of a first type to show existence of representative items in the plurality of items and letters of a second type to show absence of representative items in the plurality of items.

13. The method as recited in claim 5, wherein the grid includes at least two sections that include respective, different sortings of the plurality of items, the at least two sections including a respective and independently operable navigation bar.

14. A system comprising:
one or more processors; and
memory including instructions that, when executed by the one or more processors, cause the one or more processors to present a user interface comprising:
a grid section presenting items in stacks, where a first stack of the stacks comprises items that satisfy a selection criteria and is revealed to include a revealed first item presented with a first revealed descriptor and a revealed second item presented with a second revealed descriptor as compared with a second stack of the stacks that is collapsed in the grid section, the first revealed descriptor including first textual information associated with the first item and the second revealed descriptor including second textual information associated with the second item, the first revealed descriptor and the second revealed descriptor presented in the grid section within the first stack, the second stack having a collapsed third item, the first revealed descriptor having at least one of a greater font size or a greater image size as compared with a third descriptor for the collapsed third item in the second stack; and
a navigation bar with a visual connector that links the grid section and a portion of the navigation bar representative of the revealed first item presented in the grid section while providing access to other ones of the items not presented in the grid section via other portions of the navigation bar, wherein receiving input associated with moving the visual connector from the first stack to the second stack causes concealment of the first revealed descriptor and the second revealed descriptor and causes display of the third item in the second stack.

15. The system as recited in claim 14, further comprising a touch screen that, when engaged by a user, controls operation of the user interface.

16. The system as recited in claim 15, wherein the user interface is responsive to a user selection of the second stack or the collapsed second item in the second stack to:
collapse the first stack;
reveal the second stack to provide a revealed second stack; and
present, in the grid within the revealed second stack, a third revealed descriptor for the revealed third item in the revealed second stack.

17. The system as recited in claim 15, wherein the navigation bar includes at least a partial alphabetic representation of the items.

18. The system as recited in claim 15, wherein the grid section is a first grid section and the user interface further comprises a second grid section including an associated navigation bar, the first grid section including the items listed by a first criterion and the second grid section including the items listed by a second criterion that is different than the first criterion.

19. The system as recited in claim 15, wherein the system is an electronic book reader device and the items are electronic books.

20. A user interface executable by a touch screen enabled device, the user interface comprising:
an item section to present items in stacks according to a selection criteria, where a first stack of the stacks is revealed to include a revealed first item of the items presented with a first revealed descriptor and a revealed second item of the items presented with a second revealed descriptor compared with a third item of the items in a collapsed second stack of the stacks, the first revealed descriptor and the second revealed descriptor presented within the first stack, the first revealed descriptor including first textual information describing the revealed first item and at least one of an image, a title, an author, or a symbol describing the revealed first item; the second revealed descriptor including at least second textual information describing the revealed second item; and
a navigation bar with a visual connector that links the item section and a portion of the navigation bar representative of the revealed first item shown in the item section while providing access to other ones of the items that are not presented in the item section via other portions of the navigation bar, wherein receiving input associated with moving the visual connector from the first stack to the second stack causes concealment of the revealed first item and the first revealed descriptor and causes display of the third item in the second stack.

21. The user interface as recited in claim 20, wherein the user interface is configured to receive commands from a touch screen that controls operation of the user interface.

22. The user interface as recited in claim 20, wherein the navigation bar further includes a description of criteria used in selecting the items, and a quantity of the items.

23. The user interface as recited in claim 20, wherein the collapsed second stack of the stacks is selectable to:
collapse the first stack and hide the revealed first item, the first revealed descriptor, the revealed second item, and the second revealed descriptor; and
reveal the second stack to include a revealed third item presented with a third revealed descriptor, the third revealed descriptor presented within the second stack, the third revealed descriptor including third textual information describing the revealed third item and at least one of a different image, a different title, a different author, or a different symbol describing the revealed third item.

* * * * *